United States Patent [19]
Willett, III

[11] 3,880,276
[45] Apr. 29, 1975

[54] CONVEYOR CHAIN
[76] Inventor: George Howard Willett, III, 807 Harcourt, Grosse Pointe Park, Mich. 48230
[22] Filed: July 9, 1973
[21] Appl. No.: 377,799

[52] U.S. Cl. .............. 198/193; 198/189; 198/195
[51] Int. Cl. ............................................ B65g 17/06
[58] Field of Search .......... 198/189, 177, 181, 195, 198/193

[56] References Cited
UNITED STATES PATENTS

| | | | |
|---|---|---|---|
| 1,804,701 | 5/1931 | Mojonnier | 198/189 |
| 2,789,685 | 4/1957 | Orwin | 198/177 R |
| 3,006,456 | 10/1961 | Ferris et al. | 198/177 R |
| 3,513,964 | 5/1970 | Imse | 198/189 |
| 3,529,715 | 9/1970 | Mueller | 198/189 |
| 3,575,282 | 4/1971 | Gaiotto et al. | 198/177 R |
| 3,589,503 | 6/1971 | Leach | 198/177 R |
| 3,768,631 | 10/1973 | Wahren | 198/189 |

Primary Examiner—Evon C. Blunk
Assistant Examiner—James L. Rowland
Attorney, Agent, or Firm—Everett R. Casey

[57] ABSTRACT

A conveyor chain having alternating links interconnected with transverse pins to permit substantial relative tilting motion between the links about two axes, and rollers individual to each of said links.

10 Claims, 9 Drawing Figures

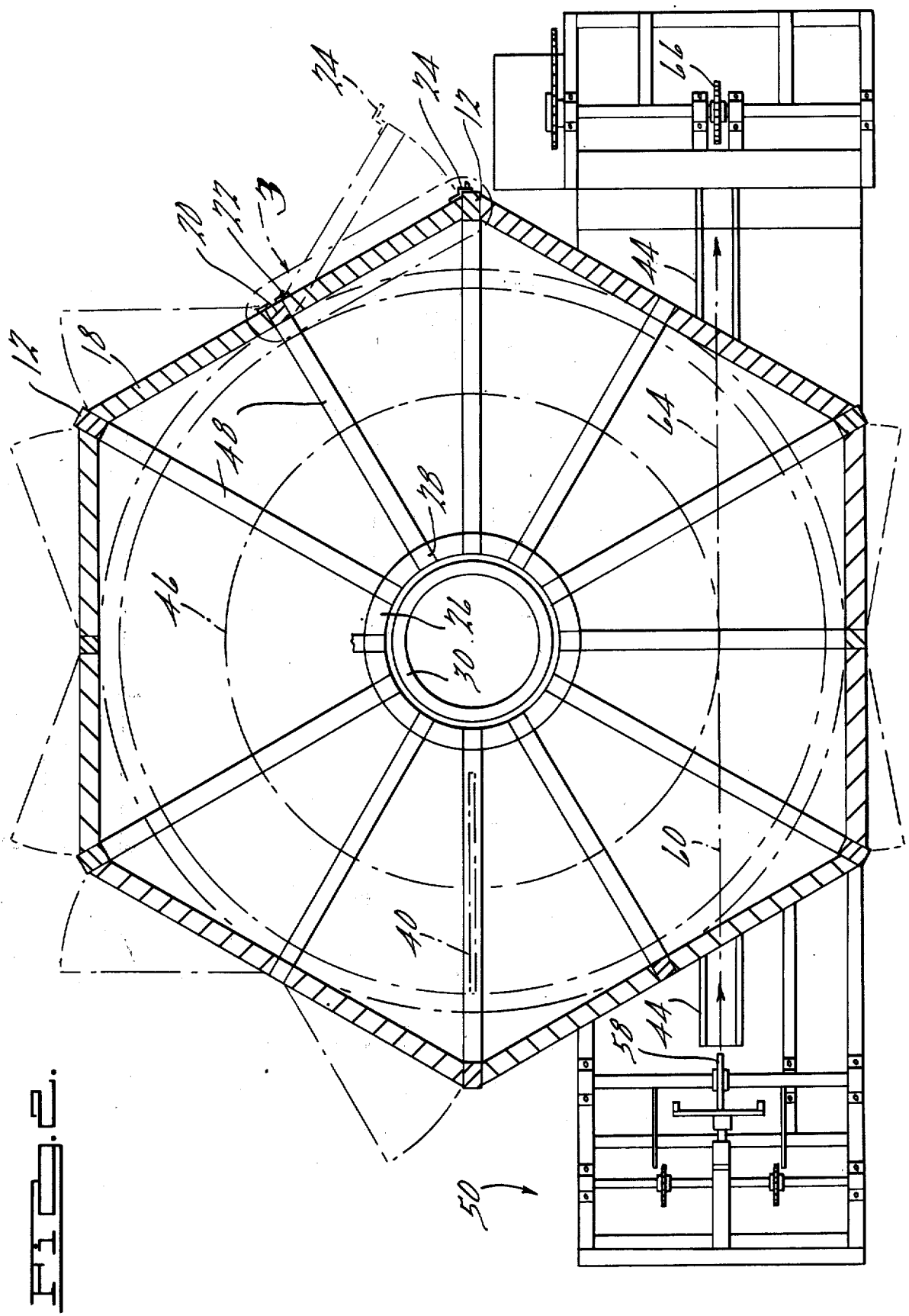

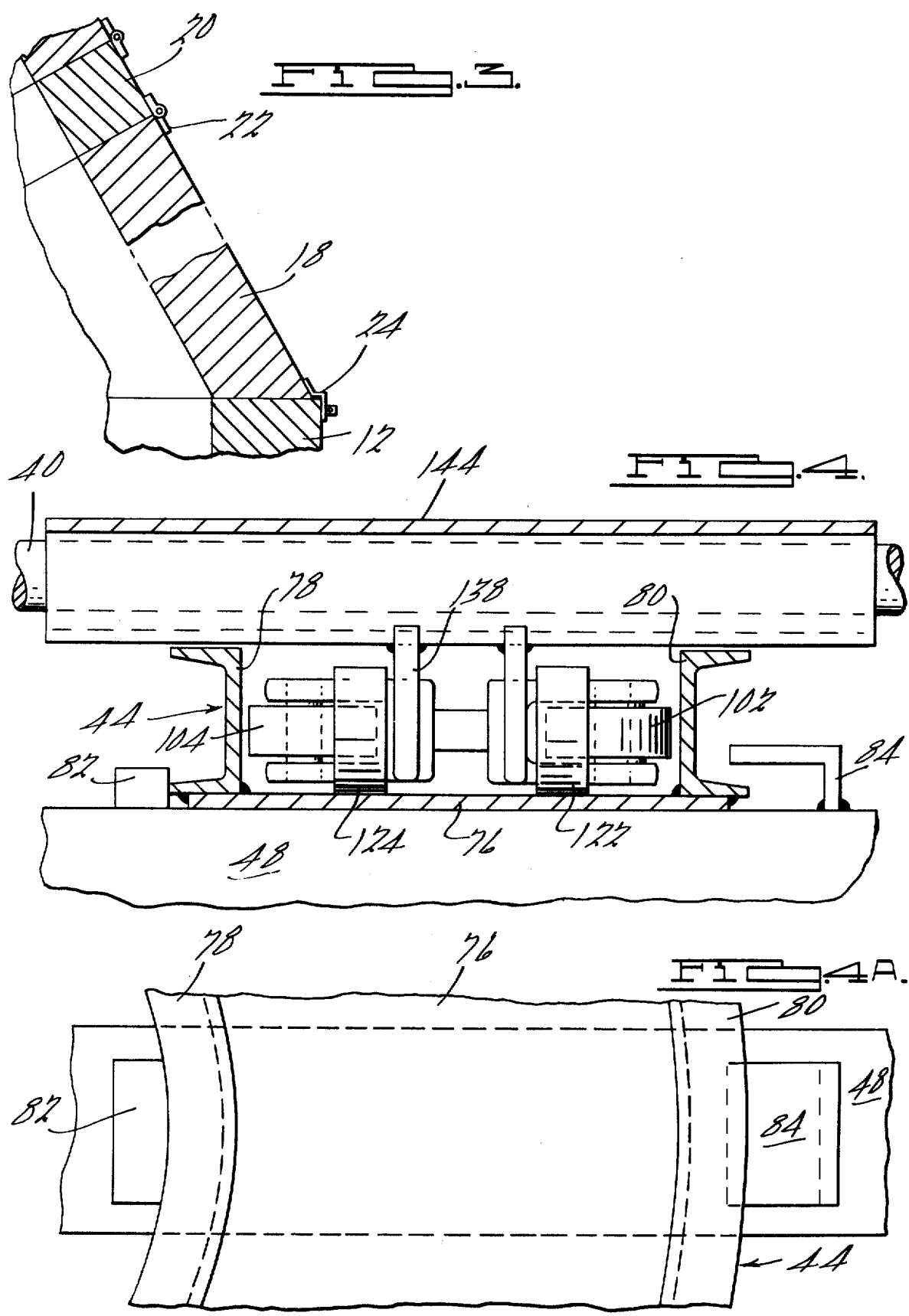

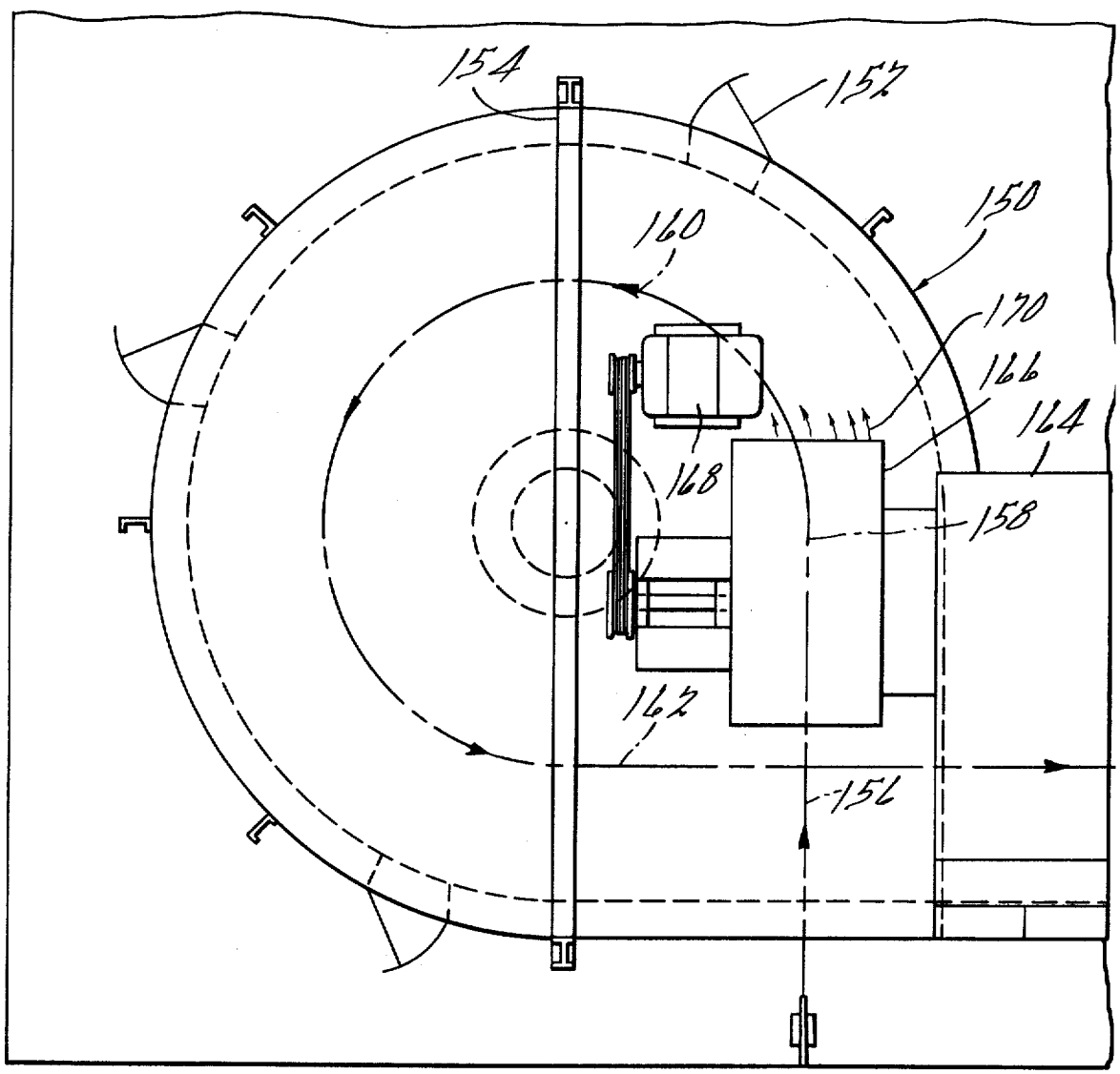
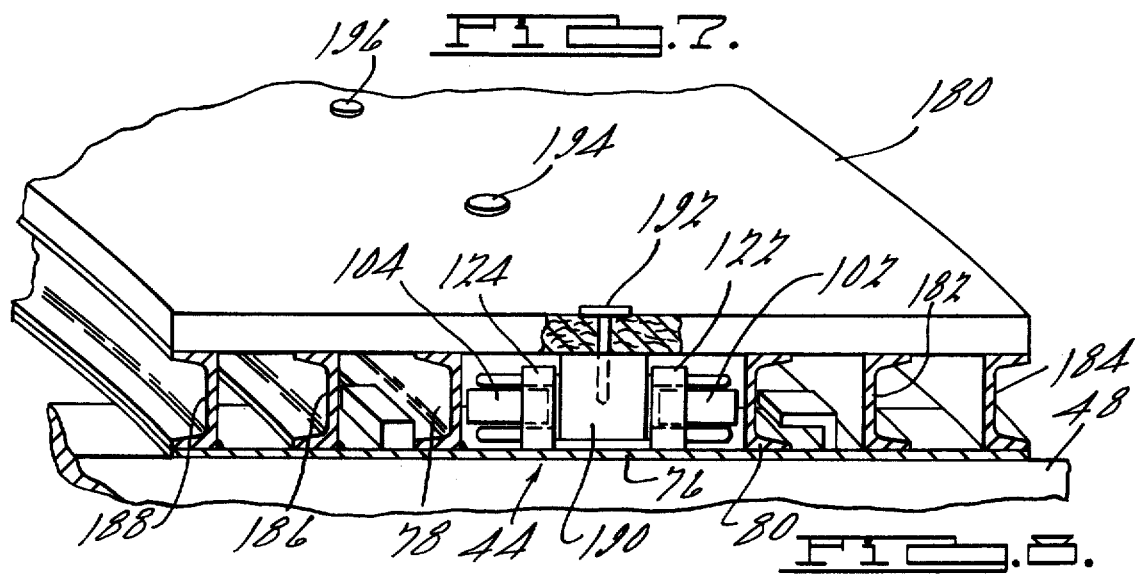

CONVEYOR CHAIN

BRIEF DESCRIPTION OF THE DRAWINGS

FIG. 2 is a sectional view taken substantially along the line 2—2 of FIG. 1;

FIG. 3 is an enlarged view of the door section identified 3 in FIG. 2 of the drawings;

FIG. 4 is an enlarged view of the track construction identified 4 in FIG. 1 of the drawings;

FIG. 4A is a fragmentary plan view of the structure of FIG. 4;

FIG. 7 is a plan view of a modified form of circular draw furnace embodying certain of the principles of the present invention; and FIG. 8 is a fragmentary elevational view in partial section of a conveyor system embodying certain of the principles of the present invention.

DETAILED DESCRIPTION

Figure 1:
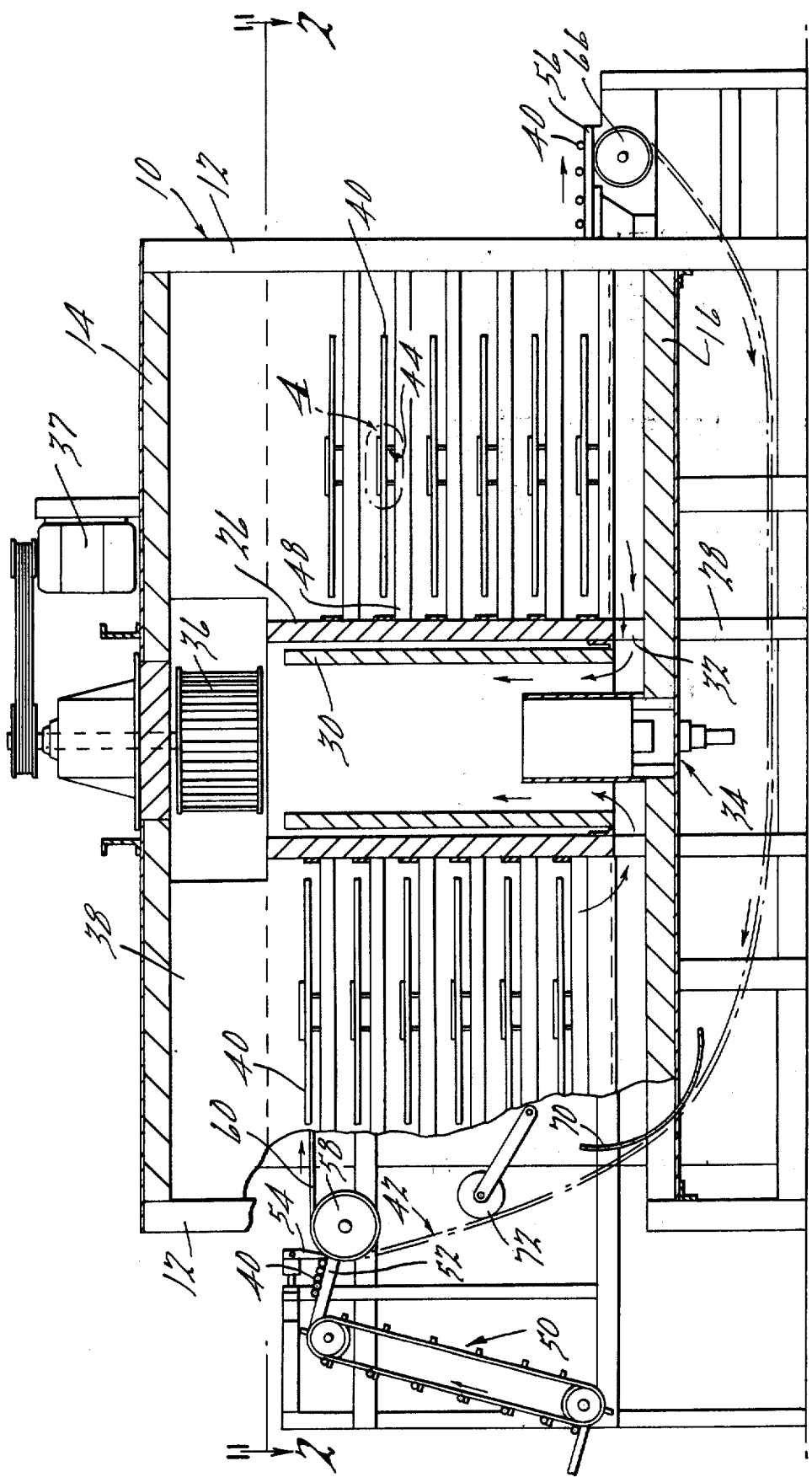
FIG. 1 is an elevational view, in partial section, of a circular draw furnace embodying certain of the principles of the present invention.

Certain of the principles of the invention have been representatively embodied in the draw furnace shown in FIGS. 1 and 2 of the drawings. Draw furnaces utilized in large manufacturing facilities commonly, at the present time, take the form of an elongated enclosed chamber of very substantial length, with a rectilinear conveyor system to transport parts therethrough, and a heating system to attempt to maintain the requisite controlled temperatures throughout the length of the furnace. The primary disadvantages of such arrangements are the difficulty of accurately controlling temperatures over such a substantial furnace length and the inordinate floor-space requirements of such an installation.

The system of FIGS. 1 and 2, which is directed to the solution of both problems, is in the nature of vertically projecting cylinder with a helical transport mechanism therewithin. The furnace or chamber 10, which is illustrated as a six sided polygonal cylinder, comprises a plurality of circularly spaced outer columns 12 supporting a heat insulating roof 14 and floor 16 as well as a plurality of heat insulating side walls 18. As is illustrated in FIG. 2, and, in enlarged view, in FIG. 3, some or all of the side walls 18 may take the form of swingable doors or pairs of doors, to permit access to the interior of the furnace. Thus, in the illustrated arrangement, an intermediate column 20 is disposed between each pair of outer columns 12, and supports, via hinges 22, a door section for swinging engagement with the adjacent outer column 12, with the door being held closed by any suitable form of latching mechanism 24.

A tubular central column 26 (FIG. 1) is centrally disposed within the cavity of chamber 10 and may be supported by a central group of circularly arrayed support columns 28 (FIG. 2). An insulating tube 30 may be disposed within the column 26, with the bottoms of both the tube 26 and the sleeve 30 being spaced from the floor 16 to permit an air circulation area 32 therebetween. In a furnace application of the principles of the invention, a burner 34 may be situated in the floor 16 coaxial with the sleeve 30, and a circulating fan 36, driven by a motor 37, may be disposed at the upper end of tube 26 so as to circulate the heated air from the burner 34 radially outwardly into a plenum 38 from which it circulates downwardly and then through the areas 32 and back to the furnace for recirculation. As will be seen, this heated-air-flow path is very short for the physical length of the treatment line, in comparison with a conventional rectilinear furnace, and hence the heating efficiency is high and the feasibility of maintaining uniform temperatures is enhanced.

In a designed physical embodiment of the structure illustrated in FIGS. 1 and 2 of the drawings, the draw furnace was to treat parts 40 in the form of automotive torsion bars which are representatively about one inch in diameter and from about 3 to 4 feet or so long, at a treating temperature of about 650° F. By utilizing principles of the present invention, a treatment line which would have to have been well in excess of 170 feet long, with a rectilinear draw furnace, was encompassed within a chamber 12 which is about 15 feet in diameter and about 13½ feet tall. Furnaces operating at much higher temperatures are also contemplated.

Parts 40 are carried by a conveyor chain, generally designated 42, which travels, over a major portion of its length, upon a conveyor track generally designated 44. Within the furnace chamber, the major portion of the length of the track 44 lies in a helical configuration, the center line of the central or helical portion of the track being designated 46 in FIG. 2 of the drawings. That helical path is preferably of uniform diameter and of a uniform pitch greater than zero, although neither characteristic is essential to the practice of all of the principles of the invention. To support the track 44, a plurality of supporting beams or spokes 48 are mounted on and radiate from the central column 26 and, more particularly, from the inner columns 28 which support and constitute a part of column 26. Those spokes may either be cantilevered from columns 26 or may be secured at their outermost ends to corresponding ones of the outer columns 12 or the intermediate columns 20.

Beams 48 are generally horizontally disposed and their upper faces generally define and lie in a helical surface. In the illustrated preferred arrangement, the beams or spokes 48 are disposed at about 30° intervals, as viewed in plan (FIG. 2), and progressively differ in elevation from the succeeding and preceding spokes, so that 12 such spokes constitute a full revolution and so that the 13th spoke lies in the same vertical plane as the first spoke but differs in elevation therefrom. Terming each such full revolution as one tier, the embodiment illustrated in FIG. 1 has six such tiers, that is, the parts are moved through six separate full 360° turns during the course of their treatment.

The track 44 is supported upon the central portions of the upper faces of the successive beams or spokes 48 in a manner to be described. It will be observed that in the preferred embodiment, the track 44 and the parts 40 preferably remain horizontal throughout their circular movement and their vertical movement.

In the plural-tier, helical-path arrangement illustrated in FIGS. 1 and 2, the parts will enter the chamber 12 at a different vertical level than they leave that chamber. While a long ascending or descending reach of conveyor may be employed at the input or the output end if desired, the illustrated arrangement utilizes an elevator loader 50 at the input end to raise the part 40 from a lower elevation to the higher elevation of the input point. The parts are loaded on stripper bars on the elevator loader 50 and are transported to a cradle 52 where they are controlled by a pneumatic gate 54 for release on to the conveyor chain at an empty flight position thereon. At the output end, the parts 40 are deposited by the conveyor chain on to a ramp 56 for subsequent treatment including, as an example, cooling to handling temperatures. As is illustrated by the arrowed lines in FIGS. 1 and 2, the conveyor chain travels from the loading point or input location 52 around a sprocket 58 and then along a rectilinear reach, designated 60. Reach 60 may be deemed the input section of the chain, and the associated portion of the track 44 may be considered the input track section.

The center line of the reach 60 of the chain and of the corresponding portion of the track 44 is tangential to and continuous with the center line of the central, helical chain and track section denoted 46 in FIG. 2 of the drawings. After the parts have traveled the tiers, the conveyor chain and track again follow a rectilinear path designated 64 on FIG. 2 which is again continuous with and tangential to the center line of the circular or helical chain and track section 46 and which may be designated the output chain and track sections. At that point, the conveyor chain passes around a sprocket 66 and returns, beneath the floor 16 of the furnace, to the input sprocket 58, being maintained under a suitable tension and in an appropriate path by means such as guide 70 and counterweight 72.

It will be appreciated at this point in the description that the principles of the invention may be applied to treatments other than heating, including as examples, the use of liquid jets, in lieu of a heat source, for cleaning parts during the transport, air drying of paint, etc. In fact, it will be apparent that the treatment could in fact be simply that of dynamic or static storge, with or without the enclosing chamber or silo.

The track 44 is shown in enlarged detail in FIG. 4 and 4A of the drawings. It comprises a horizontally disposed bottom plate 76 welded to a pair of channels 78 and 80, those channels being disposed with their web faces facing one another. The upper surface of plate 76 constitutes a supporting surface for the conveyor chain and the inner web faces of channel 78 and 80 serve as laterel guide surfaces for that chain. As may best be seen in FIG. 4A, the base 76 and the channels 78 and 80 are curved pursuant to the center line 46 as shown in FIG. 1, the degree of curvature being exaggerated in the drawing of FIG. 4A for clarity of understanding.

If the track elements are subjected to heating, as during the operation of a furnace, the preferred method of positioning the track in relation to the supporting members is one in which there is no direct welding, bolting or other securing of the base plate 76 to the individual spokes or beams 48. Rather, the inner diameter of the track is positioned in relation to the several beams 48 by means of inner stops 82 which are welded or otherwise secured to the respective beams 48 but which is not welded or otherwise secured to any portion of the track 44. At the outer radius of the track, an outer guide or clip 84 is welded or otherwise secured to each of the beams 48 and overhangs a flange of each of the channels 80 to insure against excessive lifting of that portion of the track. A similar arrangement could be provided in lieu of inner stops 82. It will be seen that the channel track 44 is free to grow radially, so that even without full freedom to expand longitudinally on heating and even without expansion joints, the channel track may expand upon heating of the furnace and grow in a radial sense to accommodate that expansion.

The conveyor chain cooperates with the track. As may best be seen in FIGS. 4, 5 and 6, the conveyor chain comprises a plurality of interconnected links. In the illustrated and preferred arrangement, each two adjacent links are of different construction, but alternate links are of similar construction.

Link 86 (and the corresponding alternate links) comprises a cast body having a tapered projecting end portion 88, having an aperture 106 therein, and an opposite, bifurcated end portion consisting of a pair of spaced arms 90 and 92. Arms 90 and 92 are provided with aligned apertures through which a transverse pin 94 is driven. Each of the arms 90 and 92 is further provided with a pair of projecting ears or spacers, such as ears or spacers 96 and 98 on arm 92. The ears of each pair are provided with end recesses to accept a shaft 100 welded or otherwise secured in position therein. Shafts 100 rotatably support horizontal guide rollers 102 and 104, which rotate in a horizontal plane about a vertical axis. Horizontal rollers 102 and 104, together with the horizontal rollers on others of the links in the conveyor chain, cooperate with the lateral guide faces of the channels 80 and 78 (FIG. 4) to provide rolling friction. This is advantageous in view of the fact that the track is curved, and hence a continuing force must be exerted to direct the conveyor chain, with its loads, to the circular course.

The adjacent link 108 comprises a similar body with a similar projecting end 110 and a similar pair of side arms 112 and 114. Arm 112 is provided with an integral spacer 116 and arm 114 is provided with an integral spacer 118, and those elements 112, 114, 116 and 118 are provided with aligned apertures to accept a shaft 120. Shaft 120 rotatably supports vertical rollers 122 and 124 which rotate in vertical planes about a horizontal axis. The central portion 126 of shaft 120 also serves the function, in links of the type of link 108, of the transverse pin 94.

Figure 5:
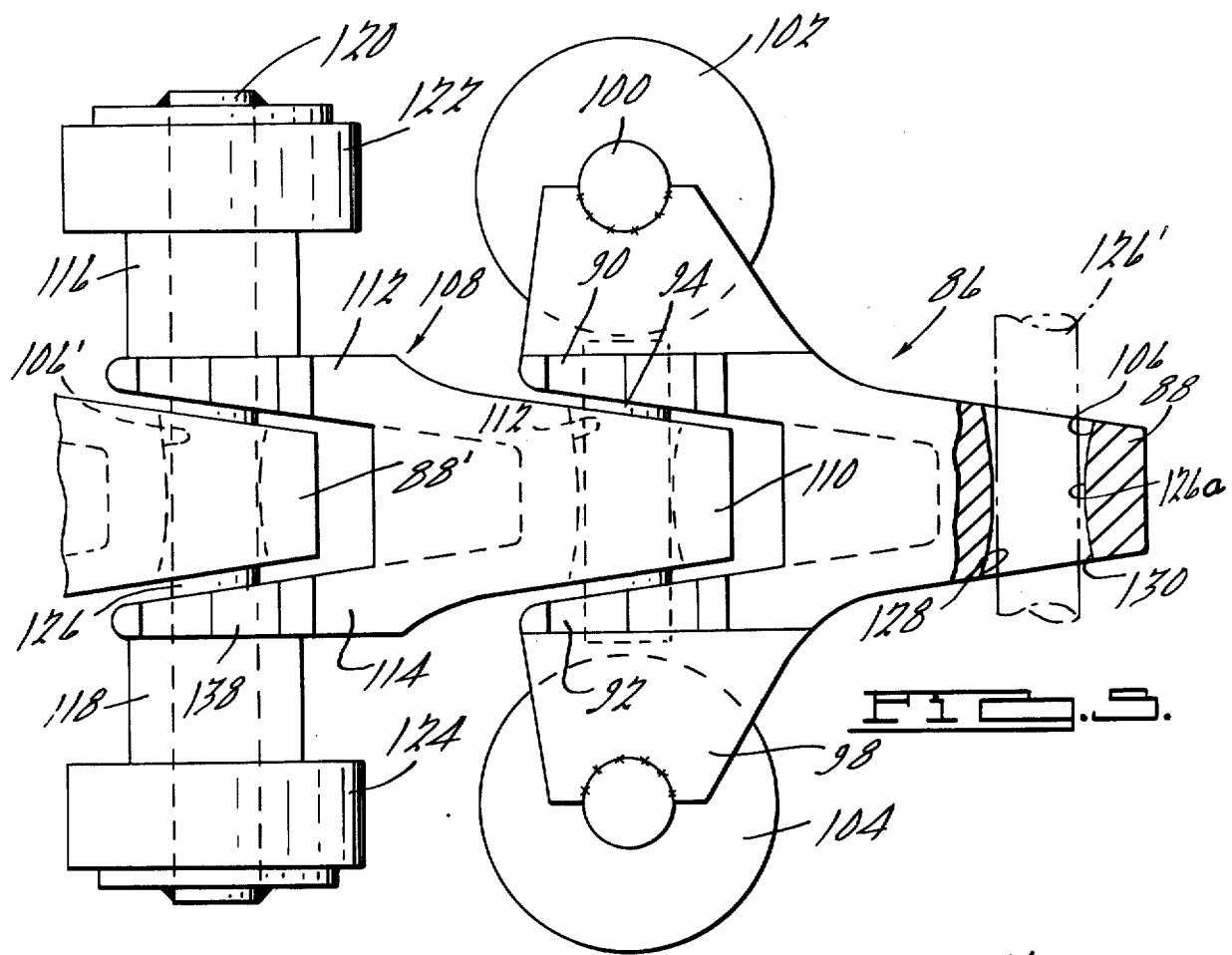
FIG. 5 is a plan view of a section of conveyor chain, with the carriers removed, embodying certain of the principles of the present invention.
Figure 6:
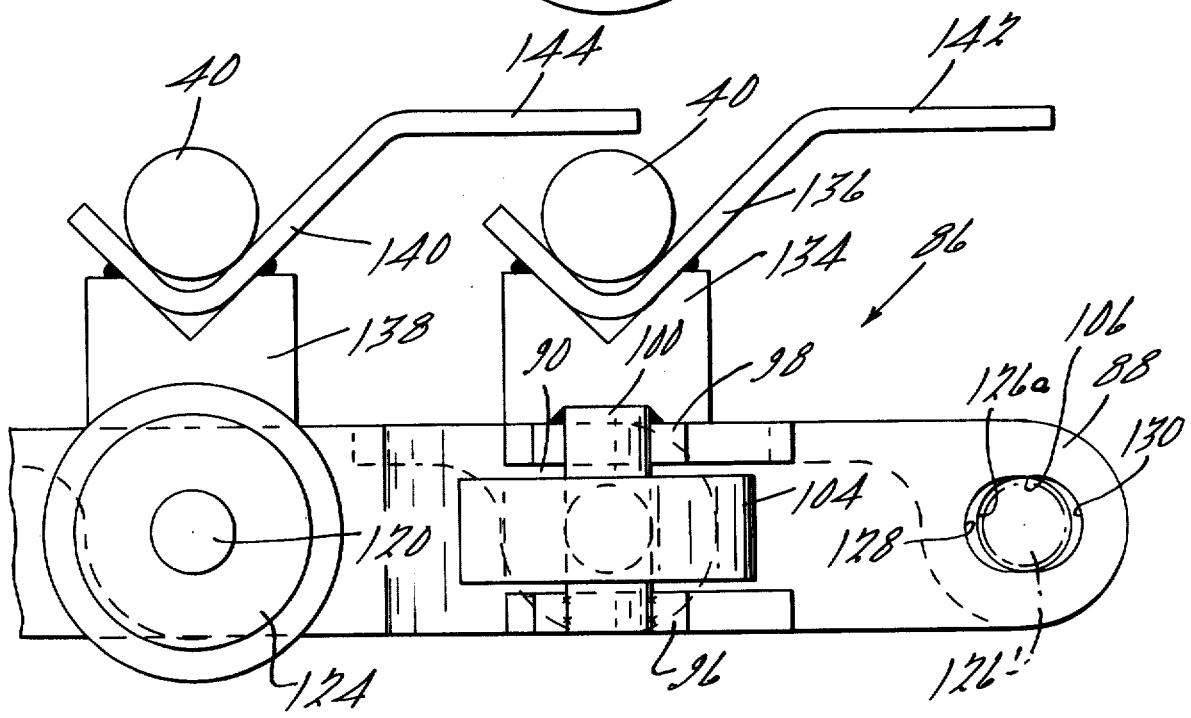
FIG. 6 is an elevational view of the structure of FIG. 5.

Projecting end 110 of link 108 is provided with an aperture 112 accepting transverse pin 94, and, correspondingly, the transverse end 88' of the next link to the left in FIG. 5 is provided with an aperture 106' to accept the transverse pin portion 126 of shaft 120.

Each of the projecting-end apertures is generally ellipsoidal in cross section. Thus, at 126a, at the longitudinal center line of projecting end portion 88, the aperture 106 is, in the illustrated and preferred embodiment, circular, that is, the ellipsoid is an ellipse having the major and minor axes equal to one another. Progressing outboard in each direction from that center line, the minor axis of the ellipsoid remains constant but the major axis increases progressively, preferably according to a curvilinear function. Thus, the lefthand or leading edge of the aperture 106, designated 128, is arcuate, and the trailing edge, designated 130, is also arcuate in an opposite sense. In the illustrated (FIG. 6) and preferred arrangement, each vertical section of both the leading and trailing face surfaces of the aperture 106 are semicircular, with a uniform radius, but in both lateral directions from the longitudinal center line of the end projection, the distance between those semicircles progressively increases. In a designated embodiment, the transverse pin, such as pin 126', which engages the aperture 106, was ⅝ of an inch in diameter and the aperture 106 at the longitudinal center line of the projecting end portion 88, that is, at 126a, was a circle of but slightly larger diameter, such as 11/16 of an inch. The radius of the arcs defining the foremost and rearmost edges of the leading and trailing faces of the aperture 106 was 3 inches.

The aperture configuration above described permits rotational motion between the projecting end of one link and the transverse pin on the next link in a horizontal plane and about the surfaces of the aperture 106. To further accommodate that motion, it will be observed that in the preferred arrangement the facing surfaces of the arms, such as arms 90 and 92, taper apart with substantially the same angle of taper as that of the projecting end portion 88 or 110 but that the taper is advanced so that the width of the projecting end 110 in the region of the transverse pin 94 is sufficiently less than the spacing between the arms 90 and 92 in that same region to accommodate relative rotational motion in a horizontal sense.

Since the several transverse pins including pin 94 are circular cylindrical, it will also be apparent that each link can rotate about the longitudinal axis of the transverse pin relative to the next link to permit the chain to undulate in a vertical sense. However, since the height of the projecting-end apertures, such as aperture 106, does not flare, twisting of one link relative to another, about the longitudinal axis of the conveyor chain, is inhibited.

In the illustrated arrangement, each link of the conveyor chain is adapted to directly support one of the products or work pieces 40. Link 86 is provided with upstanding bracket means 134 supporting a carrier 136, welded or otherwise secured thereto, into which the work piece 40 seats. Correlatively, link 108 is provided with supporting bracket means 138 to which a carrier 140 is suitably secured. Each of the carriers 136 and 140 may be provided with projecting flanges such as 142 and 144 designed to overlie and captivate the work piece 40 in the next adjacent link during normal travel of the conveyor chain, but to be pivoted, as the chain passes around a sprocket, to open the supporting seat of the next adjacent link in order to permit removal and replacement of work pieces.

The modified furnace illustrated in FIG. 7 is or may be similar in construction to that previously described in detail herein. The chamber or silo is circular (polygonal with an infinite number of sides) and is provided with a plurality of access doors 152. A seam line structure 154 is provided so that the furnace may be shipped in two halves and assembled at the site. The input section of the conveyor chain and track, designated by the rectilinear portion 156 is tangential at a point 158 to a circular and helical section 160. In this arrangement, the work ascends, in a single tier, from the input to the output, rather than descends as in FIGS. 1 and 2. The helical portion 160 extends for about 270° and then joins, continuously, with an output section 162 which is tangential thereto. In this arrangement, the combustion chamber 164 is majorly outside of the chamber 150 and the heated air is circulated by a fan 166, driven by a motor 168 in a direction indicated by arrows 170 in the direction of the travel of the work pieces. The air circulates circumferentially of the chamber 150 and then re-enters the combustion chamber 164 for reheating.

The modification of FIG. 8 illustrates the association of the conveyor chain shown in the prior drawings with a transversely reticulatable conveyor belt 180 which may be of any suitable commercially available form such as woven wire or flat wire or crescent plates and having the capability of flexing not only up and down in a vertical sense relative to the plane of its movement, but also of flexing in its own horizontal plane. The web 180 may be wide relative to the conveyor chain structure to accommodate wide or bulk objects including, as examples, bread or other bakery goods, with the conveyor serving as an element of an oven. The lateral portions of the web 180 may be supplementally supported by means including support channels 182, 184, 186 and 188, or the like. Instead of work supporting brackets utilized with the conveyor chain of the prior figures, certain of the links of the conveyor chain may be provided with a support block 190 having a vertical aperture therein to accept a pin 192 extending through the web 180, other pins such as 194 and 196 also being provided.

Modifications and other illustrations of the principles of the invention will be apparent to those skilled in the art.

What is claimed is:

1. A conveyor chain movable along a center line of movement comprising a series of alternating first and second links, each link comprising a pair of spaced arms defining a bifurcated end and an oppositely projecting end having a transverse aperture therethrough, a transverse pin secured to and extending between said spaced arms and passing through the transverse aperture in said projecting end of an adjacent link, the distance between said arms at any point being greater than the width of said projecting end of the adjacent link at that point and the aperture in said projecting end being larger than said pin for permitting substantial relative tilting motion between said links about each of two mutually perpendicular axes, a first plurality of pairs of rollers individual to said first links, a second plurality of pairs of rollers individual to said second links, the rotational axis of each roller in said first plurality of rollers being substantially perpendicular to the rotational axis of each roller in said second plurality of rollers, the axis of rotation of each roller in said first plurality of pairs of rollers being substantially coaxial with one of said mutually perpendicular axes at the one of said first links individual thereto, the axis of rotation of each roller of said second plurality of pairs of rollers substantially intersecting one of said mutually perpendicular axes at the one of said second links individual thereto, said mutually perpendicular axes being substantially intersecting.

2. The combination of claim 1 in which each of the rollers of the pair of rollers which is individual to each of said second links is intersected by the other one of said mutually perpendicular axes at the second link individual thereto.

3. A conveyor chain movable along a center line of movement comprising a series of alternating first and second links, each link comprising a pair of spaced arms defining a bifurcated end and an oppositely projecting end having a transverse aperture therethrough, a transverse pin secured to and extending between said spaced arms and passing through the transverse aperture in said projecting end of an adjacent link, the distance between said arms at any point being greater than the width of said projecting end of the adjacent link at that point and the aperture in said projecting end being larger than said pin for permitting substantial relative tilting motion between said links about each of two mutually perpendicular axes, a first plurality of pairs of rollers individual to said first links, a second plurality of pairs of rollers individual to said second links, the rotational axis of each roller in said first plurality of rollers being substantially perpendicular to the rotational axis of each roller in said second plurality of rollers, the two rollers of each of said first plurality of pairs of rollers having a common axis of rotation, the two rollers of each of said second plurality of pairs of rollers being substantially coplanar and having spaced apart parallel axes of rotation.

4. The combination of claim 3 in which the transverse aperture in each of said projecting ends has leading and trailing faces engageable with the said pin of an adjacent link, each of said faces being substantially semi-circular in cross section and of substantially uniform radius, the distance between said faces progressively increasing each side of the longitudinal center line of said projecting end.

5. The combination of claim 3 in which said mutually perpendicular axes are substantially intersecting.

6. The combination of claim 3 in which the axis of rotation of each roller in said first plurality of pairs of rollers is substantially coaxial with one of said mutually perpendicular axes at the one of said first links individual thereto, and in which the axis of rotation of each roller of said second plurality of pairs of rollers substantially intersects one of said mutually perpendicular axes at the one of said second links individual thereto.

7. The combination of claim 6 in which said mutually perpendicular axes are substantially intersecting.

8. The combination of claim 7 in which the two rollers of each of said second plurality of pairs of rollers are substantially coplanar with said center line.

9. The combination of claim 8 in which the transverse aperture in each of said projecting ends has leading and trailing faces engageable with the said pin of an adjacent link, each of said faces being substantially semi-circular in cross section and of substantially uniform radius, the distance between said faces progressively increasing each side of the longitudinal center line of said projecting end.

10. A conveyor chain comprising a series of links, each link comprising a pair of spaced arms defining a bifurcated end and an oppositely projecting end having a transverse aperture therethrough, a transverse pin secured to and extending between said spaced arms and passing through the transverse aperture in said projecting end of an adjacent link, the distance between said arms at any point being greater than the width of said projecting end of the adjacent link at that point and the aperture in said projecting end being larger than said pin for permitting substantial relative tilting motion between said links about each of two mutually perpendicular axes, a plurality of shaft means each having a longitudinal axis and individual to and supported by a plurality of said links, the longitudinal axis of certain of said shaft means extending perpendicularly to the longitudinal axis of others of said shaft means, and a plurality of pairs of rollers rotatably supported by and individual to said shaft means, the rotational axis of each roller in each pair of rollers individual to said certain shaft means being substantially perpendicular to the rotational axis of each roller in each pair of rollers individual to said others of said shaft means, the transverse aperture in said projecting end having leading and trailing faces engageable with the said pin of an adjacent link, each of said faces being substantially semi-circular in cross section and of substantially uniform radius, the distance between said faces progressively increasing each side of the longitudinal center line of said projecting end.

* * * * *